(12) United States Patent
Günther et al.

(10) Patent No.: US 10,442,170 B2
(45) Date of Patent: Oct. 15, 2019

(54) DEVICE, SPECIAL PAPER, AND METHOD FOR PRODUCING SHAPED ARTICLES

(71) Applicant: Voxeljet AG, Friedberg (DE)

(72) Inventors: Daniel Günther, München (DE); Ingo Ederer, Geltendorf (DE)

(73) Assignee: VOXELJET AG, Friedberg (DE)

( * ) Notice: Subject to any disclaimer, the term of this patent is extended or adjusted under 35 U.S.C. 154(b) by 235 days.

(21) Appl. No.: 15/105,993

(22) PCT Filed: Dec. 16, 2014

(86) PCT No.: PCT/EP2014/003378
§ 371 (c)(1),
(2) Date: Jun. 17, 2016

(87) PCT Pub. No.: WO2015/090567
PCT Pub. Date: Jun. 25, 2015

(65) Prior Publication Data
US 2016/0311210 A1    Oct. 27, 2016

(30) Foreign Application Priority Data

Dec. 20, 2013  (EP) .................................... 13005959

(51) Int. Cl.
| | |
|---|---|
| *B32B 37/12* | (2006.01) |
| *B33Y 10/00* | (2015.01) |
| *B33Y 30/00* | (2015.01) |
| *B33Y 70/00* | (2015.01) |
| *B32B 7/14* | (2006.01) |
| *B32B 29/00* | (2006.01) |
| *B32B 37/18* | (2006.01) |

(Continued)

(52) U.S. Cl.
CPC ........ *B32B 37/1292* (2013.01); *B29C 64/141* (2017.08); *B32B 7/14* (2013.01); *B32B 29/005* (2013.01); *B32B 37/18* (2013.01); *B32B 38/10* (2013.01); *B32B 41/00* (2013.01); *B33Y 10/00* (2014.12); *B33Y 30/00* (2014.12); *B33Y 70/00* (2014.12); *D21H 5/00* (2013.01); *B32B 2255/12* (2013.01); *B32B 2317/12* (2013.01)

(58) Field of Classification Search
CPC .............. B29C 64/141; B32B 2255/12; B32B 2317/12; B32B 29/005; B32B 37/1292; B32B 37/18; B32B 38/10; B32B 41/00; B32B 7/14; B33Y 10/00; B33Y 30/00; B33Y 70/00; D21H 5/00
USPC ........................................ 156/277, 291, 295
See application file for complete search history.

(56) References Cited

U.S. PATENT DOCUMENTS

| | | | |
|---|---|---|---|
| 3,913,503 A | 10/1975 | Becker | |
| 4,247,508 A | 1/1981 | Housholder | |

(Continued)

FOREIGN PATENT DOCUMENTS

| | | |
|---|---|---|
| AU | 720255 B2 | 5/2000 |
| DE | 832937 C | 3/1952 |

(Continued)

OTHER PUBLICATIONS

US 4,937,420 A, 06/1990, Deckard (withdrawn)
(Continued)

*Primary Examiner* — Sonya M Sengupta
(74) *Attorney, Agent, or Firm* — The Dobrusin Law Firm, P.C.

(57) ABSTRACT

The invention relates to a device, a special paper and a method for producing three-dimensional objects.

21 Claims, 6 Drawing Sheets

(51) Int. Cl.
  *B32B 38/10*      (2006.01)
  *B32B 41/00*      (2006.01)
  *D21H 27/00*      (2006.01)
  *B29C 64/141*     (2017.01)

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 8/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 6/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,897,825 A | 4/1999 | Fruth et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,318,418 B1 | 11/2001 | Grossmann et al. |
| 6,316,060 B1 | 12/2001 | Elvidge et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |

(56) References Cited

U.S. PATENT DOCUMENTS

| | | |
|---|---|---|
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Noel et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0280185 A1 | 12/2005 | Russell et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |

(56) References Cited

U.S. PATENT DOCUMENTS

| | | |
|---|---|---|
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506203.5 U1 | 6/1995 |
| DE | 4440397 | 9/1995 |
| DE | 19525307 A1 | 1/1997 |
| DE | 19530295 C1 | 1/1997 |
| DE | 19533960 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| EP | 0076781 A2 | 4/1983 |
| EP | 0 224 621 A1 | 6/1987 |
| EP | 0361847 B1 | 4/1990 |
| EP | 0870622 A1 | 10/1998 |
| EP | 1415792 | 5/2004 |
| EP | 1457590 A | 9/2004 |
| FR | 515824 A | 4/1981 |
| GB | 1025694 A | 4/1966 |
| GB | 2297514 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 01/40866 A2 | 6/2001 |
| WO | 2001/078969 A2 | 10/2001 |
| WO | 2004/014637 A1 | 2/2004 |
| WO | 2006/100166 A1 | 9/2006 |
| WO | 2008/061520 A2 | 5/2008 |
| WO | 2009/049384 A1 | 5/2009 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2015/081926 A1 | 6/2015 |
| WO | 2015/085983 A2 | 6/2015 |
| WO | 2015/090265 A1 | 6/2015 |
| WO | 2015/090567 A1 | 6/2015 |
| WO | 201/5096826 A1 | 7/2015 |
| WO | 2015/078430 A1 | 8/2015 |
| WO | 2015/149742 A1 | 10/2015 |
| WO | 2015/180703 A1 | 12/2015 |
| WO | 2016/019937 A1 | 2/2016 |
| WO | 2016/019942 A1 | 2/2016 |
| WO | 2016/058577 A1 | 4/2016 |
| WO | 2016/095888 A1 | 6/2016 |
| WO | 2016/101942 A1 | 6/2016 |
| WO | 2016/146095 A1 | 9/2016 |

OTHER PUBLICATIONS

International Search Report, Application No. PCT/EP2014/003378, dated Mar. 11, 2015.
Written Opinion of the International Search Authority, Application No. PCT/EP2014/003378, dated Mar. 11, 2015.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-133.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary.
EOS Operating Manual for Laser Feb. 22, 2005 Sintering Machine, Part 1 with Brief Summary, Feb. 22, 2005.
EOS Operating Manual for Laser Feb. 22, 2005 Sintering Machine, Part 2 with Brief Summary, Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, pp. 2-15.

DEVICE, SPECIAL PAPER, AND METHOD FOR PRODUCING SHAPED ARTICLES

CLAIM OF PRIORITY

This application is a national phase filing under 35 USC § 371 from PCT Application serial number PCT/EP2014/003378 filed on Dec. 16, 2014, and claims priority therefrom. This application further claims priority from European Patent Application EP 13005959.5 filed on Dec. 20, 2013. PCT Application Number PCT/EP2014/003378 and European Patent Application Number EP 13005959.5 are each incorporated herein in their entireties by reference.

The invention relates to a device, a special paper and a method for producing three-dimensional objects.

A method for producing three-dimensional objects from computer data is described in the European patent specification EP 0 431 924 B1. In this method, a particulate material is applied in a thin layer to a platform, and a binder material is selectively printed onto the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of all the layering techniques, 3D printing based on powdered materials and the supply of liquid binder is the fastest method.

This method may be used to process different particulate materials, including natural biological raw materials, polymers, metals, ceramics and sands (not an exhaustive list).

In the powder bed-based system, a complex powder handling is characteristic, which makes any use outside of an industrial environment more difficult.

Additive manufacturing methods for producing three-dimensional object according to a data record are known from the literature, some of which work with layered source materials such as paper and thus circumvent the powder handling.

The layer data that represents a section of the model at the particular height may be used, for example, in a method for the purpose of cutting a special paper along the desired layer contour, using a laser or a blade guided on a plotter mechanism. The paper may be coated on one side, for example, with an adhesive. Another layer of paper is then placed on the cut paper layer and glued to the preceding layer. Another cutting operation now takes place, whereby only the current paper layer should be separated on the basis of the current contour data. The operations of applying paper and cutting are repeated until the desired component is completely contained in the paper stack. Lastly, the paper surrounding the contour must be separated from the component. This may be made easier if additional auxiliary cutting paths are introduced into the paper stack.

A procedure of this type is described, e.g., in U.S. Pat. No. 5,730,817 and is generally known under the term, Laminated Object Manufacturing, or LOM for short.

Another advantage of the technology lies in the use of paper or paper-like materials, which are cost-effectively available and may be purchased in a high standard of quality. In this case, the paper is fed to the device in the form of a roll.

In another specific embodiment by the MCor company, commercial paper in the form of sheets is used in the A4 size typical for printers. The sheet of paper is again cut with a blade. With the aid of a special apparatus, adhesive is applied to the paper only in the locations where the later object will be produced. This has the advantage that the surrounding paper layers may be very easily detached from the actual model. A new sheet of paper is subsequently placed on the stack, recut and glued. The operation is repeated until the desired paper is present in the paper stack. Once again, the surrounding paper must then be removed to obtain the component.

The disadvantage of the aforementioned systems is that expensive special machines are needed for producing the 3D object, which the customer must first acquire and install.

The investment in the technology is generally too high, in particular, for customers who have only an occasional need for printed 3D objects.

One object of the application was therefore to provide a method which makes it possible to create three-dimensional objects according to a CAD data record without high investment costs.

Another object of the application was to provide materials which may be used to produce three-dimensional objects easily and cost-effectively, using common printers.

A further object of the application was to provide methods and, if necessary, materials which at least partially mitigate the disadvantages of the prior art or avoid them altogether.

BRIEF DESCRIPTION OF THE INVENTION

In one aspect, the invention relates to a device for producing 3D objects.

In another aspect, the invention relates to a special paper which is suitable for producing 3D objects.

In another aspect, the invention relates to a method for producing 3D objects.

In another aspect, the invention relates to a method for producing 3D objects for use as casting molds, which are preferably subjected to additional method steps following a first method step.

DETAILED DESCRIPTION OF THE INVENTION

A number of terms in the invention are explained in greater detail below.

Within the meaning of the invention, "3D printing method" relates to all methods known from the prior art which facilitate the construction of components in three-dimensional molds and are compatible with the described method components and devices.

"Selective binder application" or "selective binder system application" within the meaning of the invention may take place using any currently available printing technology. This includes ink-jet printers, laser printers and dot matrix printers.

"Molded body" or "component" or "object" within the meaning of the invention are all three-dimensional objects that are produced with the aid of the method according to the invention and/or the device according to the invention and which have a nondeformability.

A printing machine, which has a similar or identical design to a paper printing machine, is used as the "device" for carrying out the method according to the invention, also generally referred to as a "printer." It may be designed as a sheet or roll machine. As a result, it contains paper feeding, separating, guiding and centering apparatuses, typically a printing unit, a fixing unit, a product storage apparatus and other components known to those skilled in the art, which therefore do not need to be discussed in greater detail here.

According to the invention, "paper" or "special paper" is understood to be a flat, smooth material layer of a defined thickness. The thickness is much less than the other two dimensions. However, "paper" is not strictly understood to be paper in the classic sense but rather film-like or sheet-like materials that are structured in such a way that they have the necessary properties for the method described. In particular, they may be selectively bound, and a molded part may be removed from the unbound special paper. In particular, the materials described below may be used for this special paper.

A "sheet" is a piece of paper which has two dimensions of approximately the same size. The factor between the dimensions is typically not more than three.

A "roll" is also a piece of paper, the dimensions deviating greatly from each other. Factors of up to several thousand are not atypical.

"Binding" is the step according to the method, in which a block is formed from the loose paper stack. At least the printed or the unprinted areas are bound.

"Remove" or "separate from unbound special paper" means that the component is released from the paper stack or the roll. Baths for dissolving unwanted material may be used, as may melting processes or burn-off processes that pulverize the paper.

"Finishing" is an intermediate step in the method, which makes it possible to intensify the effect of the material or the information applied by the printing process for subsequent processes such as binding or removal.

Within the meaning of the invention, "positive printing" is understood to be the fact that an object is produced directly, which forms the essentially desired shape. This object may still be finished or subjected to additional method steps.

"Negative printing" within the meaning of the invention is understood to be that a 3D body is produced, which may be used as a casting mold either directly or after additional treatment steps for the purpose of producing the ultimately desired object.

The invention, along with its preferred specific embodiments, is described in greater detail below.

One core of the invention is the finding that nearly every consumer in an industrial country today owns a 2D printer. According to the invention, this printer is used to produce layers with the aid of special paper. The 3D body is then produced from the layers in one or multiple finishing treatment steps. Another step then deals with releasing the object from the paper stack. Both steps following printing and stacking should be able to be carried out using simple means, at best those available in the home.

In other embodiments, the advantages of this method are transferred to new types of devices, since this offers significant advantages over the prior art, not only in the area of low investments.

In one aspect, the invention relates to a device that is suitable for producing a three-dimensional body from individual layers, including:

a. an apparatus for guiding and positioning special paper;
b. a printing device for printing special paper
c. a finishing treatment and/or calibration unit, a sensor system obtaining, during production, position information in a series of special papers in a stack or a roll, which may be used to correct the printed images and the position of these images.

All known and suitable printer units may be used in this device, the device preferably being or having an ink-jet print unit, a laser print unit and/or a dot matrix print unit.

The device may furthermore include a temperature control unit.

In another aspect, the invention relates to a special paper that is suitable for producing a three-dimensional body from individual layers. The special paper preferably has the following properties:

a. activatable tendency to bind with an adjacent layer of a special paper;
b. variable tendency to be dissolved by printing with a medium;
c. capacity of the special papers to bind to each other, due to the activation in the areas defined by printing;
d. solubility of the unbound special paper due to the action of a suitable solvent, heat and/or mechanical energy The special paper may contain all materials that may be glued or bound together, or it may be made therefrom; the basic substance of the special paper is preferably made of cellulose fibers, or it is selected from the materials of plastic, naturally occurring substance, metal, stone, mineral or ceramic, or it is a combination of these substances.

It is advantageous from an environmental standpoint if the components contained in the special paper are essentially non-toxic.

As described, printing preferably takes place in multiple layers, i.e. on a series of sheets of special paper, and the sheets obtained in this manner are then bound together in a selected sequence in another step for the purpose of producing the three-dimensional object. The special paper has a binding capacity which may take place due to a fluid or a powder.

The binding capacity preferably takes place by adding a substance or changing a property of the special paper, preferably the activation takes place by transferring fluid or powder on the ink ribbon of a dot matrix printer, an ink-jet printer or by the fixed powder of a laser printer or copier. The binding capacity more preferably takes place due to a variable microwave selectability in the special paper, or the binding capacity takes place due to the presence or lack of a diffusible medium. The binding capacity more preferably takes place via the diffusion of a temperature-activatable substance.

The special paper may be provided in all suitable forms, preferably in the form of sheets or rolls.

In another aspect, the invention relates to a method for producing a three-dimensional body, including the steps:

a. printing special paper as described above;
b. repeating the printing process until all sectional drawings of a three-dimensional body are present on the special paper in a given layer thickness of the special paper;
c. organizing all printed special papers obtained in step b.) into a suitable arrangement;
d. binding the special papers arranged in this manner;
e. removing the obtained three-dimensional body from unbound special paper.

In the method according to the invention, the special paper is preferably used in individual sheets, unseparated or perforated paper rolls.

Printing takes place with the aid of suitable printing means, preferably an ink-jet, dot matrix or laser printer.

In one preferred step, a water-containing substance is applied to the special paper, preferably by an ink-jet printer, a thermoplastic is applied to the special paper, preferably by a laser printer, or a highly viscous adhesive is applied to the paper, preferably by the ribbon of a dot matrix printer, and the selected areas are thus preferably bound.

The binding of the material of the selected areas may preferably be triggered by thermal energy and/or by pressure. The binding is more preferably triggered by another substance.

The three-dimensional body obtained in this manner may preferably be removed from the unbound special paper by a dissolution process in a solvent, by a thermal process or mechanically.

Following the method according to the invention, the three-dimensional molded body may preferably be subjected to additional processing steps, preferably a saturation or a perfusion of the three-dimensional molded body and/or an application or introduction of a substance for hardening the three-dimensional molded body.

The special paper according to the invention may furthermore be used in all methods which are suitable for producing three-dimensional objects.

One aspect of the invention is furthermore a three-dimensional object produced with the aid of one of the methods described above.

Preferred aspects of the invention are described in greater detail below.

In one aspect, the invention relates to an application in the home area. This refers to users who only rarely require a 3D object and own a normal 2D printer.

Figure 1:
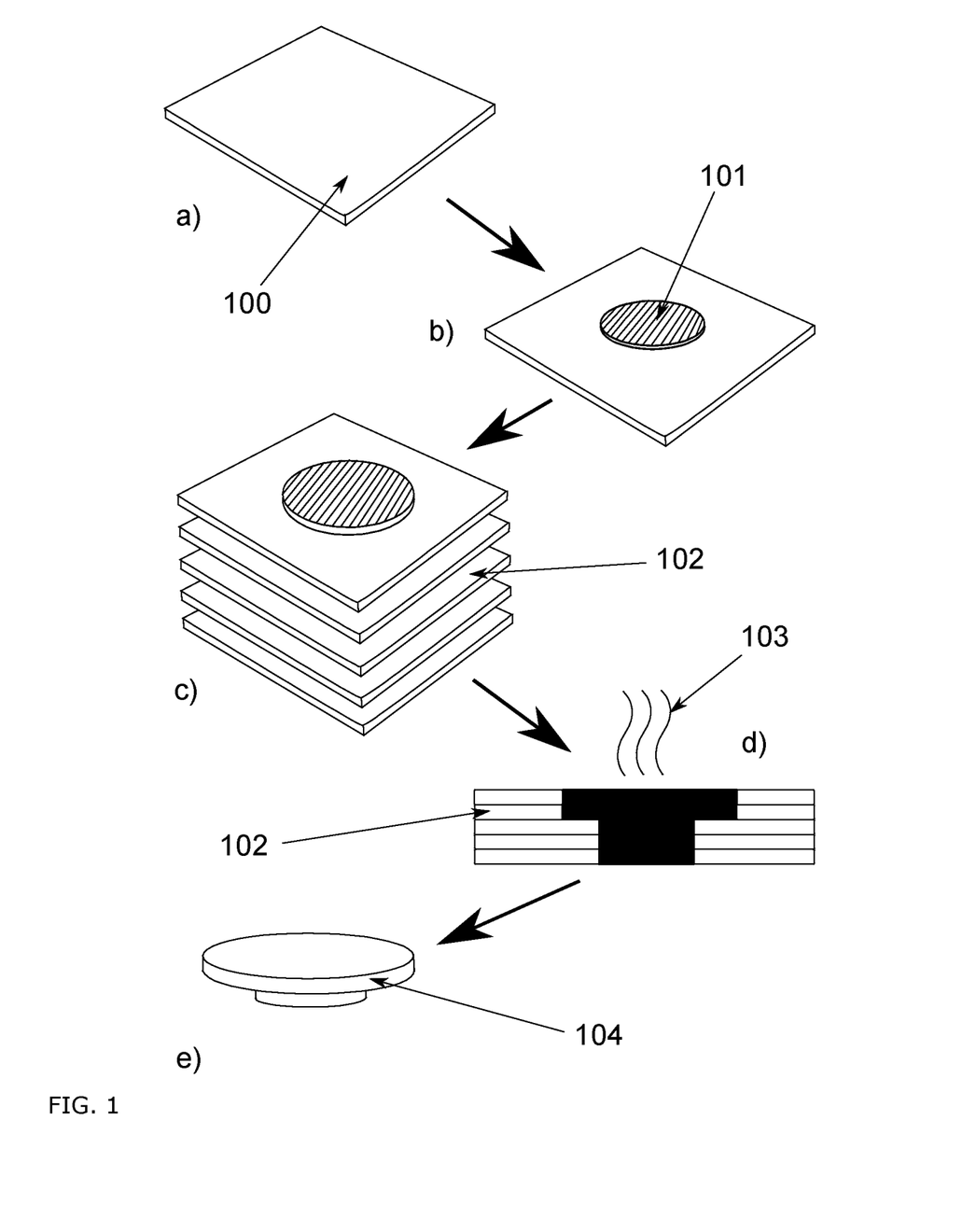
FIG. 1: shows a schematic representation of the method according to the invention
Figure 2:
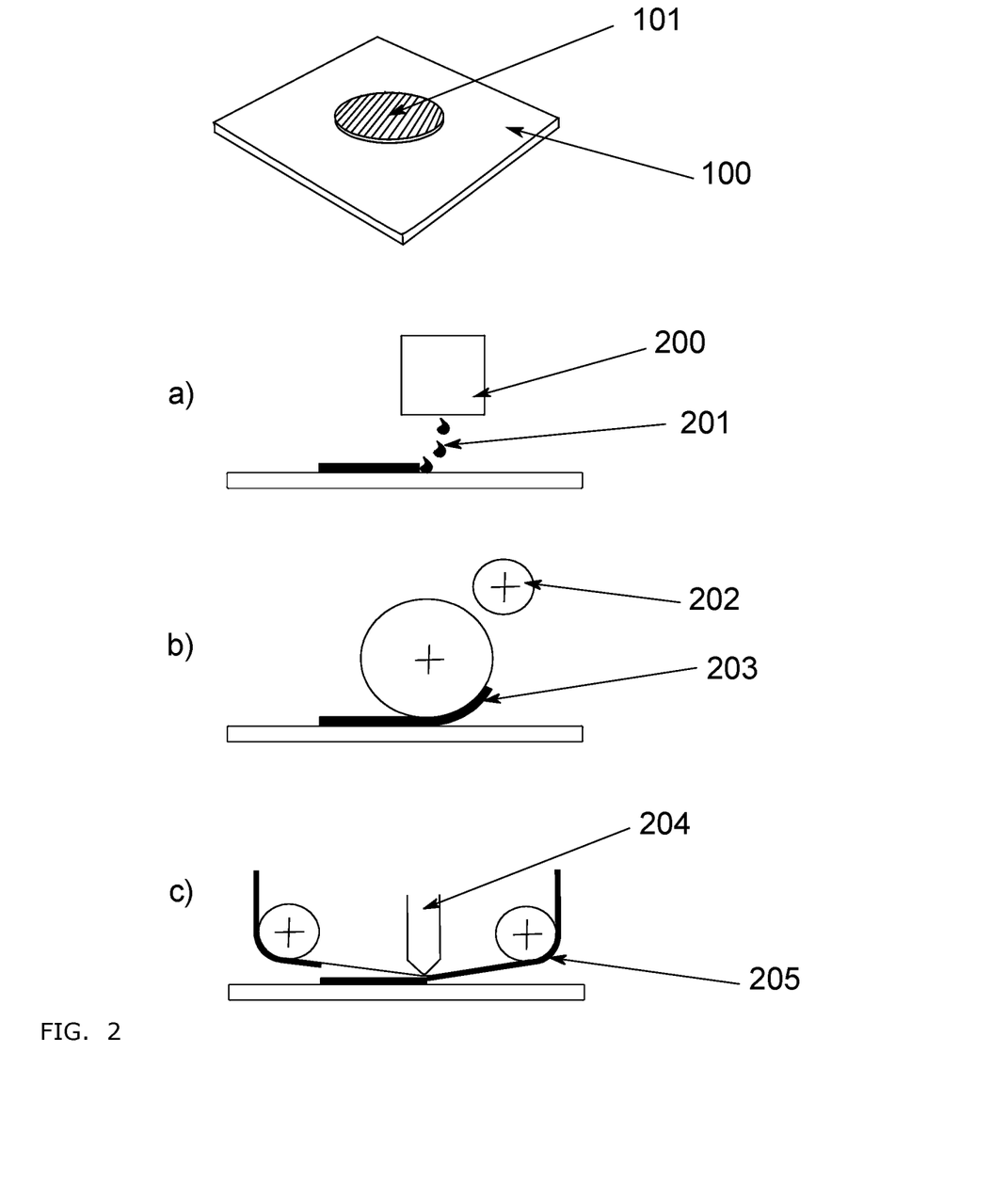
FIG. 2: shows a schematic representation of different printing methods.

According to the invention, the user is to insert and print a special paper (100) into the normal printer. The particular printouts are the sectional drawings of the 3D object. The layer thickness, and thus the cutting position in the data record, are defined by the layers already printed and the sheet thickness. For example, a laser printer, an ink-jet printer or a dot matrix printer is used as the printer (FIG. 2). Different materials may be applied thereby.

Figure 3:
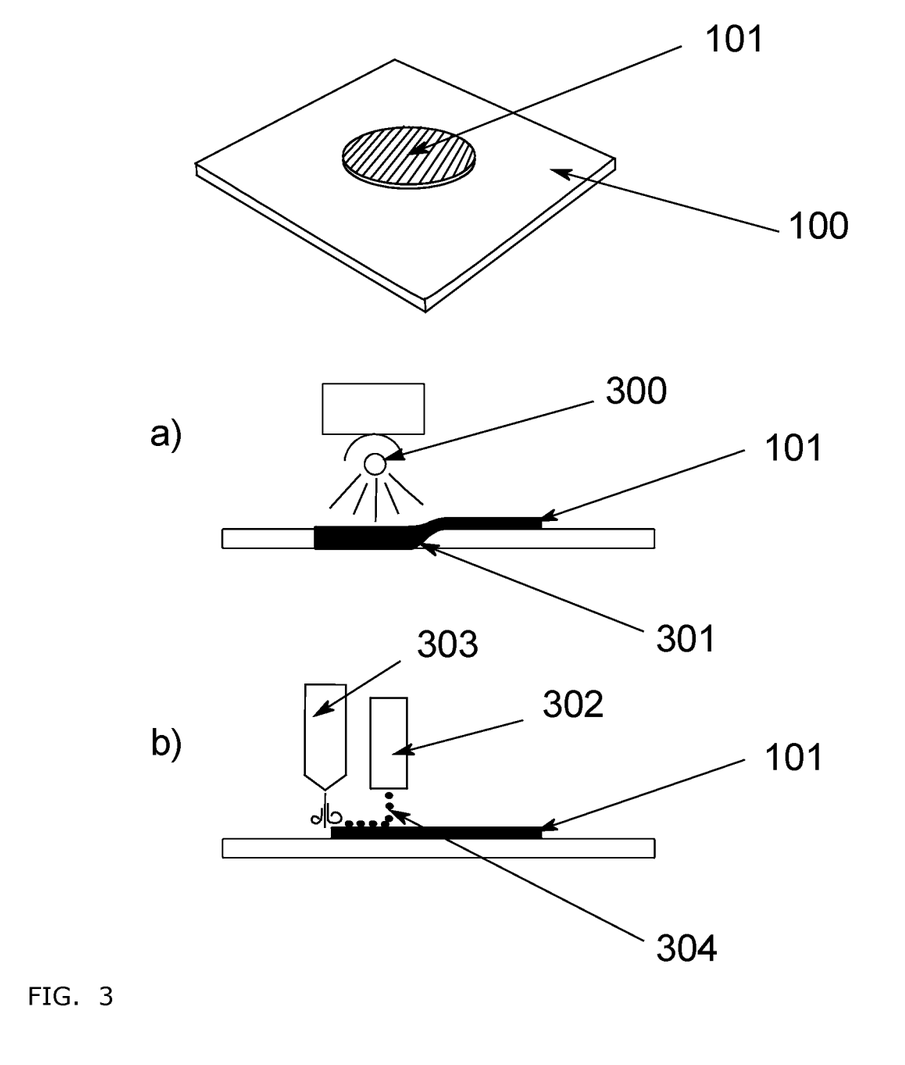
FIG. 3: shows a diagram of finishing methods.

For example, the printed material may be largely water which is used solely as an information carrier. It may itself change a property in special paper (100), or it may be used after a finishing process (FIG. 3). A composition of this type may be found in the inks of an office ink-jet printer. The water may also contain a soluble plastic, which is cross-linked in a subsequent oven process and thus results in the desired body, the special paper immobilizing the print medium in this case.

Alternatively, an image (203) made of a polymer is melted with the paper using a laser printer.

A dot-matrix printer usually applies a highly viscous ink. It may again be used in a finishing process.

Sheet stack (102) from the printer is subsequently sorted thereon and precisely stacked. The user then places the stack, e.g., in the home oven, for the purpose of binding the individual layers. Heat (103) melts, for example, part of the printed image and diffuses into one or both adjacent sheets, preferably the top sheet.

Figure 4:
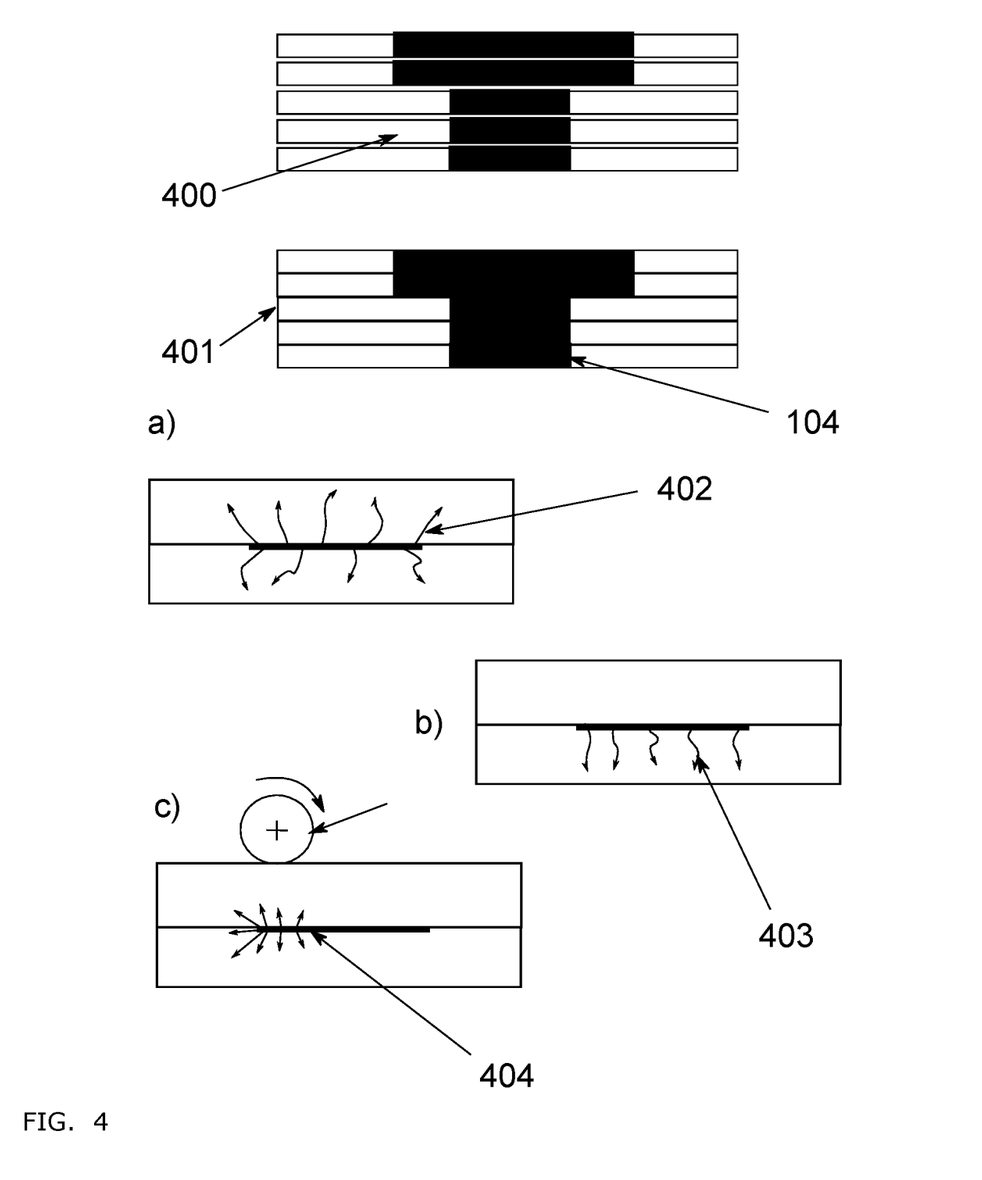
FIG. 4: shows the binding of the layers by means of diffusion, gravity or pressure.

Different mechanisms may be activated. On the one hand, the molten material is distributed in all spatial directions (402). On the other hand, additional constraining forces become active, such as gravity or an externally applied pressure (403, 404).

It is likewise possible to place the sheet stack in a home microwave. This is suitable, in particular in connection with the use of an ink-jet printer. The printed water may be prevented from evaporating by components, such as solid thickeners (e.g., xanthan gum, gelatin, polyvinyl alcohol, polyethylene glycoles, molar mass >600 g/mol) and/or liquid thickeners (e.g., propylene glycol, glycerin, polyethylene glycol, molar mass <600 g/mol) in special paper (100). In the microwave, energy is absorbed in the printed locations in a targeted manner and heat is effectively produced, due to the high absorption of the microwave radiation of the water. The high heat development, in turn, may be used to locally melt a component provided in special paper (100) and thus bind sheet stack (102).

In an alternative specific embodiment, only the unprinted areas melt, since the evaporation cold results in the fact that the temperature in the printed locations is not high enough to melt the component (e.g., plastic) contained on the special paper, e.g. due to the lack of a humectant and/or more volatile constituents in the printing medium.

Figure 5:
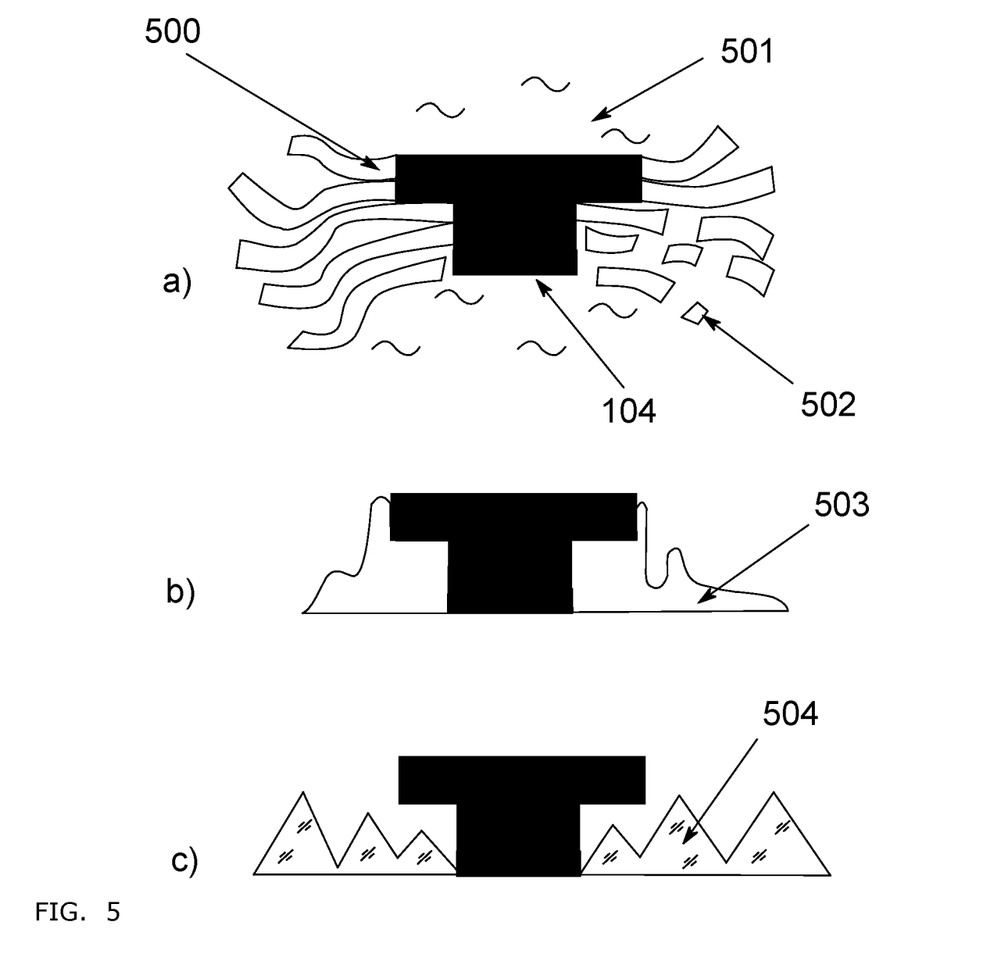
FIG. 5: shows different processes for removing the molded part

Thus solidified, sheet stack (102, 401) is placed in a solvent, e.g., a water bath (501). The unprinted paper dissolves, and desired molded body (104) is released.

In an alternative specific embodiment, the user removes the sheet stack from the printer and sorts and stacks it. The user now places the stack into a liquid medium, e.g. an artificial resin, for binding the individual layers. The liquid then penetrates only the printed areas, because the special paper has developed a special absorption capacity, for example due to the dissolution of a protective layer with respect to the resin and the ability to mix with the print medium. In another case, the liquid penetrates only the unprinted areas, since the printed areas have been sealed against the introduction of liquid, and the resin is unable to mix with the print medium. The liquid now hardens, e.g. due to chemical reaction, after a certain waiting time or by the action of energy in the form of heat or radiation, and binds the desired molded body. At the end of the reaction, the special paper surrounding the molded body is dissolved, e.g. in a solvent.

One essential prerequisite for this method is the use of non-toxic and easy-to-handle special paper and the ability to use preferably commercial print media. No toxic substances should be released either during handling or during binding. Likewise, the dissolution process should preferably not cause waste water pollution.

A method is thus created, which makes it possible to carry out production at home in the case of low demand for 3D objects. Only a stack (102) of special paper (100) is needed for this purpose. The remaining requirements already exist in most homes.

A key component in this method is special paper (100). It must be activatable with the aid of commercial printers without damaging them. The activation must result in a binding of the individual paper sheets, and the mold must be removed after the process.

The activation may take place using a commercial laser printer (FIG. 2a), as briefly discussed above. During the printing process, a layer (203) of a water-insoluble, thermoplastic is applied to the paper and fixed by melting.

To be able to carry out the other steps, paper (100) may have a water-soluble design. Layers (203) applied by the printing process penetrate the paper, due to the oven process, and change the solubility. After dipping the sheet stack into a water bath (501), molded part (104) is available.

Interestingly, a full color molded part may also be obtained by means of the method, if the color information for the printout is contained in the molded part. For this purpose, the data, including the layer-precise color information, is printed onto the special paper with the aid of an ink-jet printer or laser printer and further processed as described above.

In a second aspect, the method according to the invention also offers advantages for industrial applications. The investments here are secondary. However, new properties may be achieved by piling papers into a stack, binding and removing them.

In particular, the main point here is the achievable production capacity. For example, different sheets may be printed simultaneously. The sheets are subsequently placed in the layer sequence by forming a stack (102).

Figure 6:
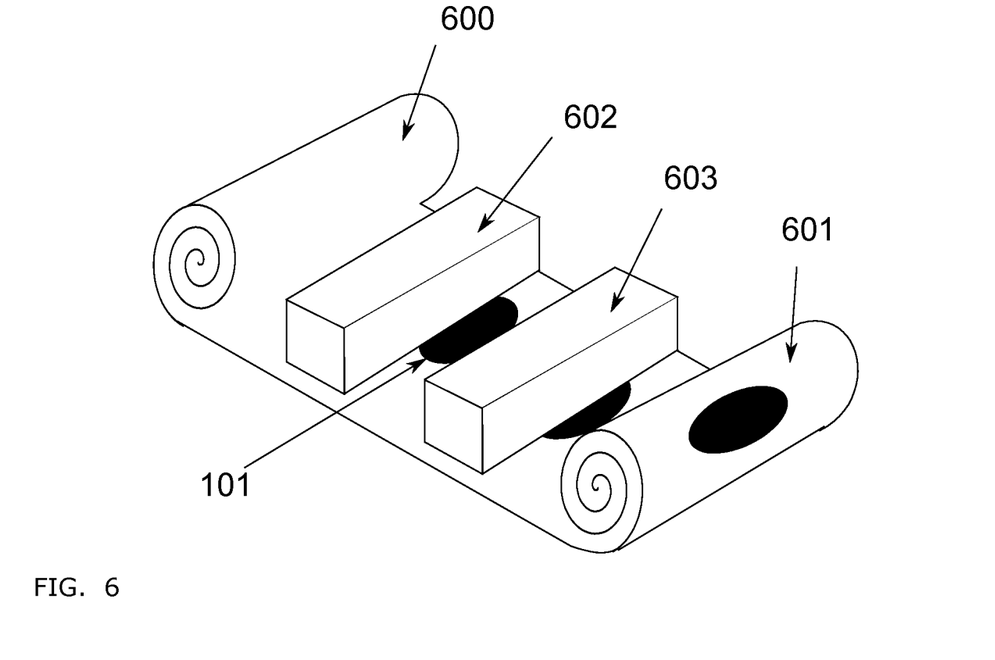
FIG. 6: shows a device according to the invention for producing 3D molded bodies with the aid of paper rolls.

It would likewise be possible to print on a paper roll (600). The roll acts as a paper stack during removal. The data must be adapted to the circumstances. Once again, different parallelizations are possible here. For example, multiple rolls may be printed and wound together.

Another advantage of the use of special paper (100) lies in the special properties that may be achieved within the layer. A wide range of base materials may be used. For example, a higher density may be produced within a layer, compared to powder-based 3D printing. This constitutes a significant advantage, e.g., in the case of sintering materials.

This system may also be used to process solidifying materials that tend to shrink. Thus, thermal expansions are not active if the special paper is adequately dense.

Additional details, examples of preferred specific embodiments and advantages of the invention are discussed below.

Exemplary Embodiments

Exemplary embodiment 1 (special paper—laser printer—home oven):

In this embodiment of the invention, the focus is on home application. The embodiment facilitates the following scenario. A user is particularly interested in a 3D object on the Internet. He buys the special paper that is compatible with his 2D printer. Special software then allows him to convert a 3D format into individual 2D images. The operation is also accompanied by the program, and software assistants are provided that control the sheet sequence. The user can now print out his stack. After careful layering, the entire stack is placed in the oven. After a cooling phase, the user flushes his component out of the stack.

This technology enables the user to produce a 3D component at home in less than 1 day. He does not have to make any investment or possess any special technical skills.

The paper composition is crucial to the process steps. In this application example, cellulose-based paper is used. The fibers are short and have a length that is far less than the sheet thickness. The sheet thickness is 80 μm, and the fibers are therefore 20 to 30 μm in length.

The grammage of the paper must be far less than 60 g/m$^2$. It is thus a very loose and lightweight paper.

The paper is bound by means of a water-soluble substance. In this example, the polymer polyvinyl alcohol (PVA) is used. The latter may be easily removed in the flushing process. Warm water increases the speed. If residues of PVA enter the sewage system, this does not pose an environmental hazard, since this plastic is biodegradable.

The polymer must be selected in terms of its melting point or glass transition in such a way that it survives the fixing process during laser printing and does not melt. Otherwise, the printout would be damaged.

This special paper (100) is subsequently printed according to layer data (101). The printing program ensures a numbering of sheets (100) and the highest possible toner application in each case. Individual sheets (100) are compiled into a stack (102, 400).

Toner based on polymethyl methacrylate (PMMA) is generally used in laser printers. This toner, which is made of micro-balls, is stuck to the paper in a layer (203) according to the data and subsequently melted with the paper due to high heat.

A paper printed in this manner demonstrates the desired hydrophobic property when placed in water. The image remains in the form of a thin film. The rest of the paper dissolves when gently stirred.

This stack (400) is then subjected to finishing treatment by heat (103) in the oven. Since paper (100) is generally a poor heat conductor, the operation must last several hours, for example in the case of a 10-cm stack made of DIN A4 papers (400). The glass transition temperature of PMMA must again be exceeded to bind the paper. The glass transition temperature of the PVA should advantageously not be exceeded so that entire stack (401) is not compressed and thus harder to dissolve later on. The oven must therefore be expediently set to approximately 100° C.

Paper stack (401) is then removed from the oven. To avoid internal distortion of the component because the thermoplastic is still soft, stack (401) must be cooled after the oven treatment. Once again, a certain amount of time is needed in this case, due to the heat conductivity. Stack (401) described above, which is 10 cm high and has the dimensions of a DIN A4 paper, should be age-hardened at room temperature for one hour.

To dissolve (FIG. 5) the unprinted paper, stack (401) is placed in a water bath (501). This may be a tub or a sink. Warm water accelerates the operation. Additional rubbing by hand or with a brush detaches adhering paper faster (500). The water should not be too hot to prevent the component from distorting, and to avoid scalding the user. If the binding of the layers is insufficient, the individual layers will separate from each other.

According to the invention, it is highly preferred that the basic substance of paper (100) is absolutely non-toxic and does not harm the environment. Dissolved material (502) may now be roughly separated from the water using a sieve and placed in the household trash. The rest is rinsed into the waste water.

Exemplary embodiment 2 (ceramic special paper—ink-jet printer—industrial oven):

The second example describes an industrial application of the aforementioned principle. The further benefits of the method are used here. An investment must be made prior to use.

This time, a ceramic film in the green state is used as paper. It is essentially made of a silicate ceramic compound. This compound is mixed with PVA and water and rolled out into a paper/film. A drying process the follows, in which all evaporable liquid is removed. The drying process must take place below the glass transition point of the PVA and in a gentle manner to avoid cracking. The temperatures must be kept below 100° C. The paper may subsequently be plasticized between two heated rollers, due to the action of heat, and calibrated for good parallelism and layer thickness control.

This paper may be further processed into sheets or used as a roll (600). After drying, it is elastically pliable, due to a thickness of less than 100 μm, and may be bent into relatively narrow rolls having a radius of 50 mm.

A device according to the invention for printing this roll provides for an unrolling unit, from which the material is fed to the process units. It is fed in a straight web under an ink-jet print head (602), an intermediate heating system and a calibration station (603).

In the example according to the invention, wax is used as the ink. The melting point is set by adding a low-melt polymer (polyethylene PE). This material may be safely processed with the aid of an ink-jet print module at a temperature of 70° C. Ceramic particles may preferably be added to the ink to reinforce the ceramic films.

The wax striking the paper is immediately cooled by the films and remains on the surface. A targeted local heating is therefore carried out in a subsequent step. The wax penetrates the paper. A precise setting of the speed of the web and the heating power are necessary to bind the paper roll afterward.

Another possible unit comprises diametrically opposed rollers. The projecting wax after the heating process, which is still flexible, is calibrated to an exact projection over the film.

The web is then rolled up onto a roller (601) under a defined pretension. Ideally, the images should now be situated one on top of the other, so that the desired components would be accurate in terms of geometry and size with imaginary cuts through the roll.

Since inaccuracies in the system are to be anticipated, sensors are used which continuously monitor the roll thickness. This signal is used to actively adjust the position and content of the printed images. All necessary conversions, such as conversion to polar coordinates, must take place.

The printing process runs continuously. The speed is limited only by the ink-jet print head and its design. All processing units may also be present multiple times. A true high-capacity production process is thus to be implemented by the invention.

At the end of the printing process, the roll is subjected to binding. As in the process for the home user, an oven is used for this purpose. The wax layers now melt into each other, and water-insoluble bodies form. The exact calibration and the high density of the rolled ceramic paper results in a highly dense ceramic green body.

The removal in this case takes place in the same manner as described, using a water bath. Water changes, other temperature controls, filtration at the dissolving medium, mechanical cleaning by means of high-pressure jets and automatic brushing may take place on an industrial scale. The loose parts may be removed from the solution by sieving.

In this example using ceramic paper, a sintering step advantageously takes place after these processes. The wax is burned off in a first step. This takes place at a temperature of up to 500° C. The molds are self-supporting, due to the high packing density even after this so-called unbinding. The burning takes place at 1,200° C.

LIST OF REFERENCE NUMERALS

100 Special paper
101 Printed area
102 Paper stack
103 Heat
104 Component
200 Ink-jet print head
201 Ink droplet
202 Toner roller
203 Toner image
204 Printing needle
205 Ink ribbon
300 Heat source
301 Penetrated material
302 Spreading with material
303 Blow-off device
400 Unbound stack
401 Bound stack
402 Capillary action
403 Gravity action
404 Pressure action
500 Adhering paper
501 Water bath
502 Free paper remnant
503 Molten paper
504 Pulverized paper
600 Roll, including source material
601 Finished "stack"
602 Print unit
603 Heating and leveling unit

What is claimed:

1. A method for producing a three-dimensional body, comprising the steps of:
    a. printing on a special paper;
    b. repeating the printing step until all sectional drawings of a three-dimensional body are present on the special paper in a given layer thickness of the special paper;
    c. organizing all printed special papers obtained in step b.) into a suitable arrangement;
    d. binding the special papers arranged in this manner;
    e. removing the obtained three-dimensional body from unbound special paper;
    wherein the special paper includes the following properties:
    a. an activatable tendency to bind with an adjacent layer of a special paper;
    b. a variable tendency to be dissolved by printing with a medium;
    c. a capacity of the special papers to bind to each other due to the activation in the areas defined by printing; and
    d. a solubility of the unbound special paper due to the action of a suitable solvent, heat and/or mechanical energy.

2. The method according to claim 1, characterized in that individual sheets, unseparated paper rolls, or perforated paper rolls are used as the special paper.

3. The method of claim 2, wherein the printing takes place with the aid of an ink-jet printer, a dot matrix printer, or a laser printer.

4. The method of claim 3, wherein the method includes a step of applying a water-containing substance to the special paper by the ink-jet printer, or applying a thermoplastic to the special paper by the laser printer, or applying a highly viscous adhesive to the special paper by a ribbon of the dot matrix printer.

5. The method of claim 1, wherein the binding action is triggered by thermal energy and/or by pressure.

6. The method of claim 1, wherein the binding action is triggered by another substance.

7. The method of claim 1, wherein the method includes removing an unbound portion of the special paper from the three-dimensional body by a dissolution process in a solvent, by a thermal process or mechanically.

8. The method of claim 7, wherein the three-dimensional body is subjected to additional processing steps, including saturating or perfusing the three-dimensional body and/or an applying or introducing a substance for hardening the three-dimensional body.

9. The method of claim 7, wherein the step of removing employs predetermined break points.

10. The method of claim 1, wherein the special paper includes a basic substance selected from the group consisting of a cellulose fiber, a plastic, a naturally occurring substance, a metal, a stone, a mineral, a ceramic, and any combination thereof.

11. The method of claim 10, wherein the special paper is in the form of a sheet or a roll; and wherein a binding capacity takes place due to variable microwave selectivity in the special paper.

12. The method of claim 10, wherein the special paper is in the form of a sheet or a roll; and wherein a binding capacity takes place due to the presence or absence of a diffusible medium.

13. The method of claim 10, wherein the special paper is in the form of a sheet or a roll; and wherein a binding capacity takes place due to the diffusion of a temperature-activatable substance.

14. The method of claim 10, wherein the special paper is formed of materials that are essentially non-toxic.

15. The method of claim 10, wherein the special paper includes a fluid or a powder which provides a binding capacity to the special paper.

16. The method of claim 10, wherein a binding capacity of the special paper is provided by a substance added to the special paper or by changing a property of the special paper.

17. The method of claim 10, wherein the activation of a binding capacity of the special paper takes place by a transferring of a fluid or a powder from an ink ribbon of a dot matrix printer, from an ink of an ink-jet printer or from a fixed powder of a laser printer or a laser copier.

18. The method of claim 1, wherein the method comprises obtaining position information in a series of special papers in a stack or a roll using a sensor system; and correcting the printed images or the positions based on the position information.

19. The method of claim 18, wherein method includes guiding and positioning the special paper; and wherein the step of printing includes printing with an ink-jet printer, a laser printer, or a dot matrix printer.

20. The method of claim 19, wherein the method includes a step of applying a finishing treatment.

21. The method of claim 19, wherein the method includes controlling a temperature of the special paper with a temperature control unit.

* * * * *

UNITED STATES PATENT AND TRADEMARK OFFICE
CERTIFICATE OF CORRECTION

PATENT NO. : 10,442,170 B2  
APPLICATION NO. : 15/105993  
DATED : October 15, 2019  
INVENTOR(S) : Daniel Gunther et al.

Page 1 of 1

It is certified that error appears in the above-identified patent and that said Letters Patent is hereby corrected as shown below:

Page 4, Foreign Patent Documents:

Delete "GB 2297514 A 8/1996" and replace with --GB 2297516 A 8/1996--

Delete "WO 2009/049384 A1 5/2009" and replace with --WO 2008/049384 A1 5/2008--

Signed and Sealed this  
Third Day of December, 2019

Andrei Iancu  
*Director of the United States Patent and Trademark Office*